United States Patent
Helms

(10) Patent No.: US 6,196,451 B1
(45) Date of Patent: Mar. 6, 2001

(54) PAPER-SIDED COMPOSITE LID

(75) Inventor: Charles R. Helms, Malvern, PA (US)

(73) Assignee: Double "H" Plastics, Inc., Warminster, PA (US)

( * ) Notice: Subject to any disclaimer, the term of this patent is extended or adjusted under 35 U.S.C. 154(b) by 0 days.

(21) Appl. No.: 09/417,442

(22) Filed: Oct. 13, 1999

(51) Int. Cl.$^7$ ................................................. B65D 43/10
(52) U.S. Cl. ................... 229/125.13; 220/782; 220/796; 229/5.5; 229/125.25; 264/268
(58) Field of Search ................................ 229/5.5, 125.13, 229/125.25; 220/780, 782, 784, 796, 799; 264/257, 265, 268

(56) References Cited

U.S. PATENT DOCUMENTS

| | | |
|---|---|---|
| 2,700,186 * | 1/1955 | Stover ................................. 264/268 |
| 2,746,669 * | 5/1956 | Moore ................................... 229/5.5 |
| 2,893,456 | 7/1959 | Wallace . |
| 2,984,382 | 5/1961 | Florsheim, Jr. . |
| 3,283,942 * | 11/1966 | Collie ............................. 229/125.13 |
| 3,397,814 | 8/1968 | Zackheim . |
| 3,412,889 | 11/1968 | Eicholtz et al. . |
| 3,428,208 | 2/1969 | Kosar . |
| 3,892,351 | 7/1975 | Johnson et al. . |
| 3,934,749 | 1/1976 | Andrulionis . |
| 3,956,550 | 5/1976 | Sutch ..................................... 428/81 |
| 3,967,731 | 7/1976 | Boduch ............................... 206/508 |
| 4,044,941 | 8/1977 | Knudsen . |
| 4,094,460 | 6/1978 | Scanga et al. . |
| 4,141,463 | 2/1979 | Smith ................................... 220/359 |
| 4,154,360 | 5/1979 | Smith ................................... 220/258 |
| 4,171,084 | 10/1979 | Smith . |
| 4,238,047 | 12/1980 | Helms et al. ......................... 220/306 |
| 4,252,248 | 2/1981 | Obrist et al. ......................... 220/270 |
| 4,299,350 | 11/1981 | Woerz ................................... 229/5.5 |
| 4,301,941 | 11/1981 | Kraft ..................................... 220/306 |
| 4,418,834 | 12/1983 | Helms et al. ......................... 220/359 |
| 4,438,864 | 3/1984 | Helms ................................... 220/265 |
| 4,442,971 | 4/1984 | Helms . |
| 4,448,345 | 5/1984 | Helms . |
| 4,560,082 | 12/1985 | Sutch ................................... 220/270 |
| 4,856,674 | 8/1989 | Berney ................................. 220/258 |
| 5,069,355 | 12/1991 | Matuszak ............................. 220/270 |
| 5,634,567 | 6/1997 | Hekal ................................... 220/359 |
| 5,647,501 | 7/1997 | Helms ................................... 220/780 |
| 5,911,334 | 6/1999 | Helms ............................... 220/359.4 |
| 6,053,353 * | 4/2000 | Helms ................................... 220/796 |

FOREIGN PATENT DOCUMENTS 2 130 565   6/1984   (GB) .

OTHER PUBLICATIONS

U.S. application No. 09/253,305, filed Feb. 19, 1999, entitled "Composite Container Closure" by Charles R. Helms (copy of application not enclosed).

* cited by examiner

Primary Examiner—Gary E. Elkins
(74) Attorney, Agent, or Firm—Synnestvedt & Lechner LLP

(57) ABSTRACT

A composite lid formed of plastic resin and paperboard is disclosed along with a method of making the lid. The lid has a primary panel of paperboard defining its center and a plurality of secondary panels, also of paperboard, continuously attached to the perimeter of the primary panel and oriented perpendicularly to its plane. A skirt of plastic resin is attached to the inside surfaces of the secondary panels, the secondary panels being in edge abutting relationship and totally covering the skirt. The primary and secondary panels thus form a lid having a continuous outer surface capable of receiving a print media, the continuous outer surface extending entirely over the lid. A bar of resin is provided around the inside surface of the primary panel and resin spokes connect the bar to the skirt. Raised segments are positioned intermittently around the inside surface of the skirt, the segments engaging a container to hold the lid in place. Sealing ribs are also formed on the inside surface of the skirt which engage the container and provide a seal between it and the container. The method of making the lid includes the steps of providing the primary and secondary panels, folding the secondary panels to form inside surfaces of the lid and injecting resin onto the inside surfaces to form the skirt.

41 Claims, 4 Drawing Sheets

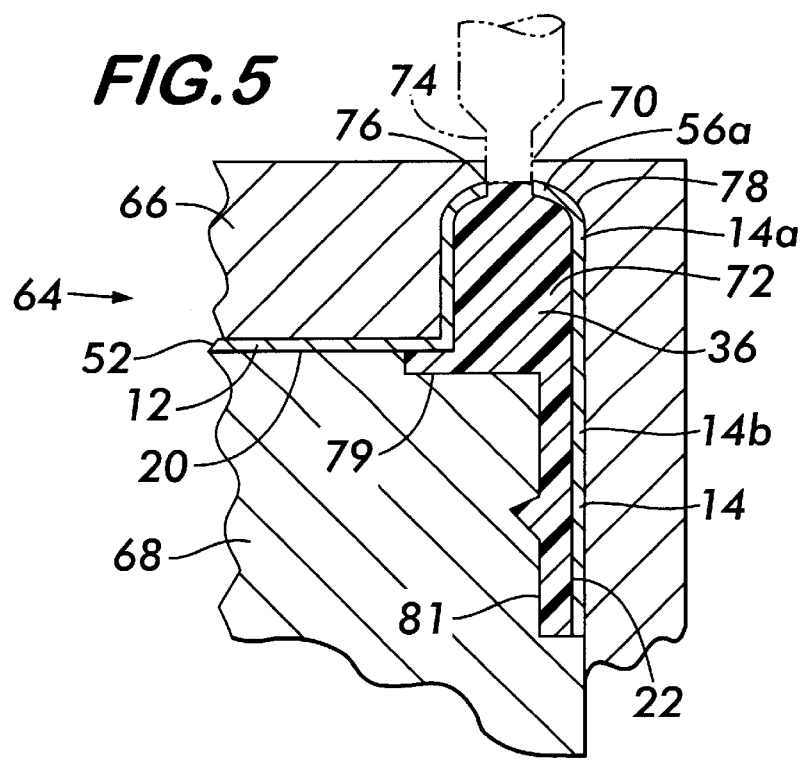
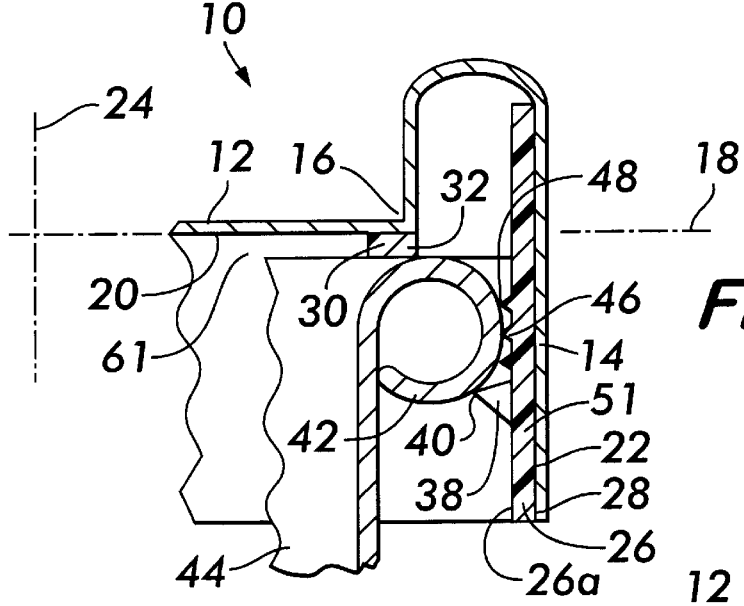
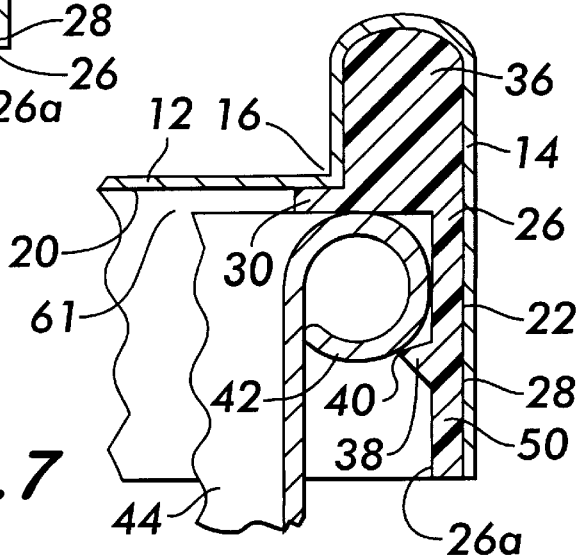

PAPER-SIDED COMPOSITE LID

FIELD OF THE INVENTION

This invention relates to lids for containers and especially to composite-type lids formed from a combination of paper and plastic materials.

BACKGROUND OF THE INVENTION

Containers used for packaging foodstuffs, as well as other products for retail sale, must perform several functions. The container must hold the product, must allow the product to be transported effectively from the manufacturer to the point of sale and from the point of sale to the consumer, must often serve to dispense and store the product after acquisition by the consumer and, no less importantly, must identify the product and its source and serve as an advertising medium to promote further sales.

It is desirable that the containers be inexpensive to manufacture, yet durable so as to continue to perform their various functions effectively despite abuse and harsh environments.

The container lid plays an important role in the proper functioning of the container. It is desirable that the lid effectively close the container, and when the container is used to store and dispense the product, it is also desirable that the lid be removable and reclosable many times over the life of the container. Ice cream containers provide a good example of a container used to store and dispense the product held in the container. Ice cream containers are also subject to conditions of freezing, thawing, moisture and repeated opening and closing of the lid, all of which tend to cause deterioration and rapid failure of the container unless it is properly designed and manufactured.

It has been found advantageous to make the lids for such containers as a composite combination of both paper and plastic materials. Lid designs currently in use comprise an injection molded plastic skirt surrounding a paperboard center. The plastic skirt fits over the end of the container, engaging the end and/or sides, thereby sealing the container and providing a means for retaining the lid in the closed position. Plastic is used for the skirt because it is inexpensive, easy to mold, resilient, impervious to freezing, thawing and moisture and relatively rigid. The skirt is the portion of the lid which sees the most abuse during the life of the container, and the above noted qualities of plastic allow the lid to maintain its shape and hold together to continue to effectively close the container despite the adverse environment and repeated handling.

It is not desirable, however, to make the entire lid from plastic. Plastic does not provide a surface capable of receiving high quality printed graphics needed for the container to fulfill its function as identifier of the product and its source and as an advertising medium for the product. Paper is the preferred medium for displaying high quality graphics regarded as necessary to compete in the advertising environment of retail sales. Thus, the paperboard center provides the means for presenting complex, colorful and detailed graphics, such as illustrations of the product, company trademarks and trade dress designs, while the plastic skirt provides a durable material impervious to abuse and environmental conditions.

A problem with the composite lid design described above is that the graphics are confined to the paperboard center portion of the lid and do not extend continuously over the plastic skirt. The absence of graphics over a portion of the container is unacceptable to many product manufacturers who want a container which can receive print media over the entire outer surface without interruption. Such continuity is important for the proper presentation of trademarks and trade dress which are vital to customer recognition of a particular product from among the many competing products displayed side by side in the typical retail sales environment. There is clearly a need for a composite lid design combining the robustness and durability of the plastic skirt with the ability to receive high quality graphics continuously over the entire outer surface of the lid without interruption.

SUMMARY AND OBJECTS OF THE INVENTION

This invention provides a lid for a container comprising a primary panel forming the center of the lid. The primary panel has an outer perimeter and a plurality of secondary panels, each of which is joined continuously to the primary panel at the perimeter.

The secondary panels are oriented substantially perpendicularly to the plane of the primary panel and extend to one side of the panel. Each secondary panel also has an inside surface facing toward the center of the lid. Both the primary and secondary panels are preferably formed from a material receptive of a print media such as paperboard.

The invention further comprises a skirt oriented substantially perpendicularly to the plane of the primary panel, the skirt having a face attached to each inside surface of the secondary panels. The skirt is formed from a relatively rigid material, preferably plastic resin such as polyethylene, polystyrene or polypropylene and supports the secondary panels.

Preferably, the primary and secondary panels are formed from a unitary blank in which each of the secondary panels comprises a first sub-panel joined directly to the primary panel along a first fold line. Each of the first sub-panels is disposed adjacent to a neighboring first sub-panel and has two oppositely arranged side edges which are in abutting relationship with a side edge of one of the neighboring first sub-panels.

A second sub-panel is distally joined to each first sub-panel along a second fold line. Each of the second sub-panels is disposed adjacent to a neighboring second sub-panel and has two oppositely arranged side edges, each of which is angularly displaced from a side edge of one of the neighboring second sub-panels.

When integrated into the lid, the first sub-panels are folded along the first fold lines in overlying relationship with an end of the skirt proximal to the primary panel thereby covering the end. The second sub-panels are folded along the second fold lines into overlying relationship with the skirt, thereby covering it. Preferably, the second sub-panel side edges are brought into abutting interengagement upon folding to form a continuous surface on the skirt. The skirt and panels are joined together by forming the skirt from an injection moldable plastic which adheres to the secondary panels, thereby holding the secondary panels substantially perpendicularly to the plane of the primary panel. Preferably, the primary and secondary panels have a surface compatible with the plastic resin forming the skirt which fuses with the skirt when the skirt is formed during the injection molding process. The compatible surface could be formed, for example, by a plastic resin coating, such as a thermoplastic. The skirt further forms a sealing surface interengagable with the container to which it mates.

The lid also has a bar which extends around the perimeter of the primary panel on the inside of the lid, the bar being attached to both the primary panel and the skirt. The bar has a relatively substantial cross-sectional area formed during the molding process by a cavity in the mold. The cavity is designed to promote flow of the plastic resin around the entire mold by offering a path of minimal resistance, thus, insuring proper distribution of resin and a completely formed lid. The bar also serves to stiffen and strengthen the lid. The bar is attached to the skirt by a plurality of integrally molded spokes which extend between the two parts. For a round lid, the spokes extend radially of the lid.

At least two of the secondary panels have adjacent side edges arranged in mutually abutting relationship. The secondary panels, thus, substantially continuously cover a portion of the face of the skirt and provide a portion of the outside surface of the lid for imprinting indicia or other print media thereon. Preferably, all of the secondary panels are in mutually abutting relationship, thereby covering the entire outer surface of the lid with a paperboard surface. The plastic resin may be injected from the side of the lid having the continuous paperboard covering by injecting the plastic through one or more ports formed between the adjacent side edges of the secondary side panels.

To ensure that the lid is removably attachable to the container, a plurality of elongated raised segments are formed which extend from the inside surface of the skirt (the inside surface being opposite the face having the covering of secondary panels). The segments are spaced end to end intermittently around the skirt and are oriented parallel to the primary panel for engaging a lip formed at the open end of the container. The interengagement of the segments and the lip removably retain the lid to the container end.

Sealing of the lid to the container is effected by a plurality of elongated sealing ribs extending from the inside surface of the skirt (the surface opposite the face covered by the secondary panels). The sealing ribs are arranged intermittently along the skirt parallel to the primary panel in a spaced apart relationship adjacent to one another. The sealing ribs are engagable with the container lip and provide a sealing interface between the lid and the container.

The invention also includes a method of making a lid for a container as described above. The method according to the invention includes the steps of:

(1) providing a primary panel for forming the center of the lid;
(2) providing a plurality of secondary panels joined to the primary panel at its periphery;
(3) folding the secondary panels substantially perpendicularly to the plane of said primary panel; and
(4) injecting a liquid plastic resin onto said surfaces of the secondary panels to form a continuous skirt.

The secondary panels are joined continuously to the perimeter of the primary panel, and both are formed from material capable of receiving a print media. During the folding step, the secondary panels are folded to one side of the primary panel and have a surface facing the center of the primary panel. The steps form a lid having a continuous outer surface capable of receiving print media.

It is an object of the invention to provide a composite lid formed from paper and plastic resin, the lid having a continuous outer surface capable of receiving print media.

It is again an object of the invention to provide a composite lid formed from paper and plastic resin, the lid having a continuous outer surface capable of receiving print media over the entire outer surface.

It is another object of the invention to provide a composite lid which will maintain its shape over the life of the container.

It is yet another object of the invention to provide a composite lid which will be removably attachable to a container.

It is still another object of the invention to provide a composite lid which is removable and reattachable to a container many times.

It is a further object of the invention to provide a lid which will endure harsh conditions of freezing, thawing and moisture without deteriorating as a result.

It is again yet another object of the invention to provide a composite lid which can be inexpensively produced.

It is still another object of the invention to provide a composite lid which can be produced by injection molding techniques.

These and other objects will become apparent from a consideration of the following drawings and detailed description of preferred embodiments of the invention.

BRIEF DESCRIPTION OF THE DRAWINGS

FIG. 5 is a partial cross-sectional view of an injection molding apparatus used to form the composite lid shown in FIG. 1, the section of the lid being shown in the molding apparatus being taken along lines 5—5 in FIG. 1;

FIG. 6 is a cross-sectional view taken along lines 6—6 in FIG. 3;

FIG. 7 is a cross-sectional view taken along lines 7—7 in FIG. 3; and

DETAILED DESCRIPTION OF THE PREFERRED EMBODIMENT

Figure 1:
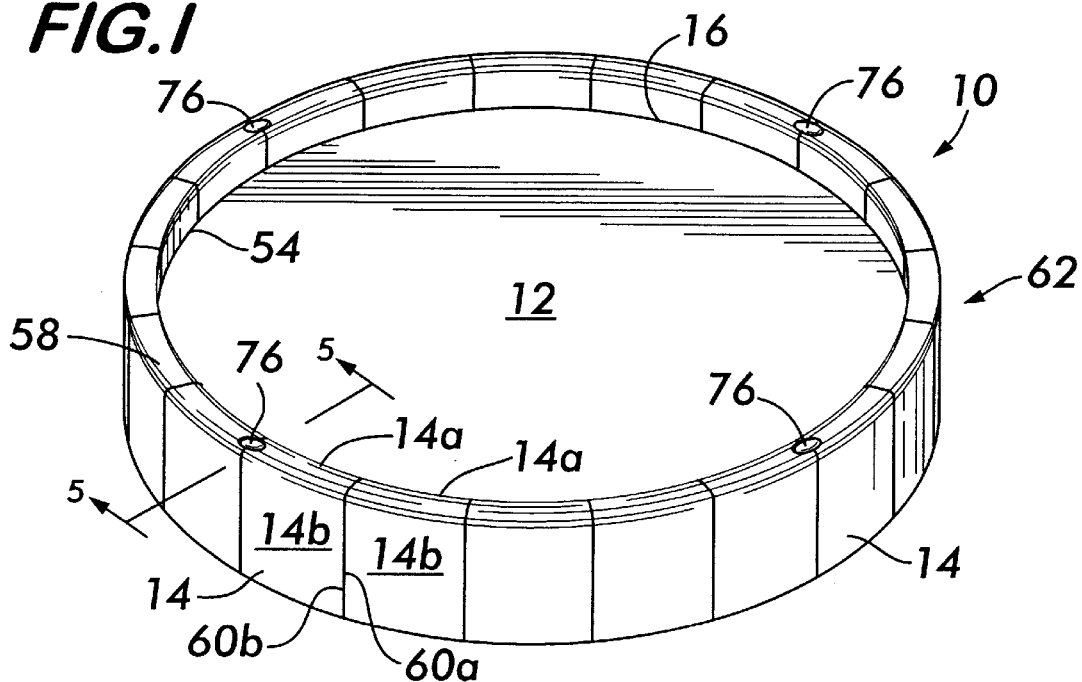
FIG. 1 is a perspective view of a composite lid according to the invention as seen from above.

FIG. 1 shows a lid 10 according to the invention comprising a primary panel 12 and a plurality of secondary panels 14 each joined continuously to the perimeter 16 of the primary panel 12. Although a round lid is shown, it is understood that this particular shape is for illustration only, as the lid according to the invention can be formed in any practical shape needed to fit a particular container design.

As best seen in FIG. 6, the secondary panels 14 are oriented substantially perpendicularly to the plane of primary panel 12, the plane being indicated by the imaginary reference axis 18. Secondary panels 14 extend to one side 20 of the primary panel 12, thereby defining the inside of the lid. Each of the secondary panels has an inside surface 22 facing toward the center of lid 10, that center being indicated by an imaginary reference axis 24.

Figure 3:
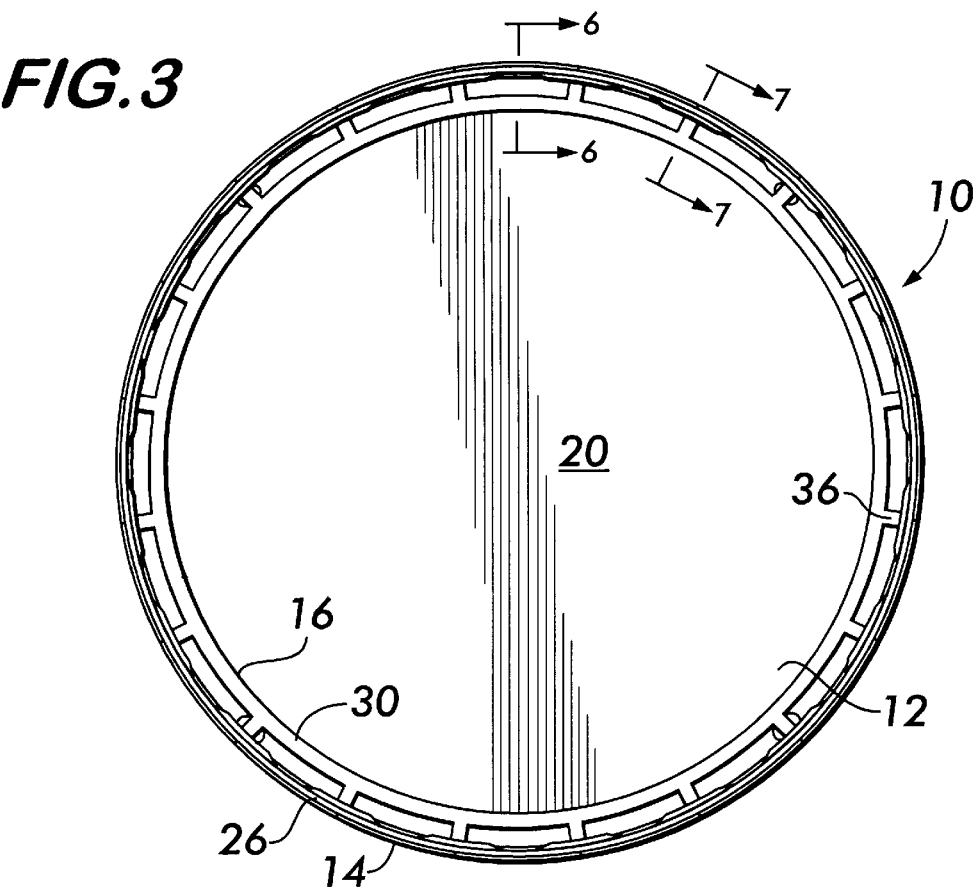
FIG. 3 is a bottom plan view of the composite lid shown in FIG. 1.
Figure 4:
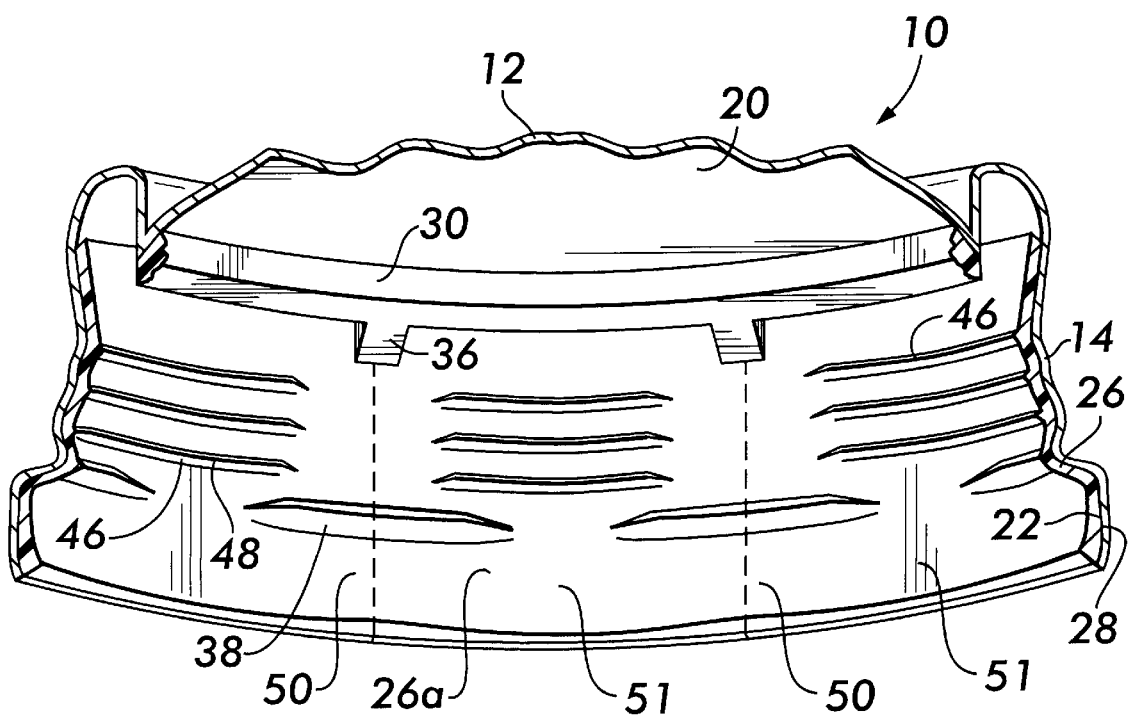
FIG. 4 is a partial perspective view of the composite lid shown in FIG. 1.

As seen in FIGS. 3, 4 and 6, lid 10 has a skirt 26 which extends circumferentially around the lid and is oriented substantially perpendicularly to the plane 18 of primary panel 12. Skirt 26 has an outwardly directed face 28 which is attached to the inside surfaces 22 of the secondary panels 14, the skirt serving to support the panels and define the overall shape of the lid 10.

Preferably, the primary and secondary panels 12 and 14 are made of a material such as paperboard which has a surface capable of receiving a print media for the imprinting of high quality graphics. Skirt 26 is preferably formed of a plastic resin such as polyethylene which is relatively rigid and capable of withstanding harsh environments such as repeated freezing, thawing and exposure to moisture without losing structural integrity. Using plastic resin also allows the skirt to be injection molded, as described in more detail below.

FIG. 4 shows further details of the lid such as bar 30. As best seen in FIG. 3, bar 30 extends circumferentially around the lid and is attached to the inwardly facing side 20 of the primary panel 12 at the perimeter 16. As seen in FIG. 6, bar 30 has a relatively substantial cross-sectional area 32 which facilitates the distribution of plastic resin to all parts of the lid during the molding process and also serves to reinforce and stiffen the lid at the perimeter 16 of the primary panel 12.

FIGS. 3 and 4 also show spokes 36 which extend radially between bar 30 and skirt 26. Spokes 36 are arranged circumferentially around the lid and provide a series of discrete connections between the bar and the skirt. The spokes strengthen the connection between the bar and the skirt, thereby reinforcing the lid, while using a minimum of plastic resin, thus, lending economy to the lid design. FIG. 7 shows a cross-sectional view of a typical spoke 36 which is preferably integrally formed with skirt 26 and bar 30. Spokes 36 also facilitate injection of the plastic resin during the molding process as described below.

FIG. 4 also shows means for engaging the end of a container to removably attach the lid and provide a seal between the lid and the container. A plurality of raised elongated segments 38 are arranged circumferentially around the inside surface 26a of the skirt 26 at spaced intervals. As best seen in FIG. 6, segments 38 extend radially inwardly and have a distal end 40 interengagable with a lip 42 on the end of a container 44, the container being only partially shown in FIG. 6. Segments 38 retain the lid 10 to the container 44 by bearing against lip 42. Both the lip and the segments are flexible and resilient, however, allowing segments 38 to pass over and deflect the lip when a predetermined force is applied to the lid. Thus, the lid can be repeatedly removed from and replaced onto the container 44 as desired, but the lid will resist inadvertent separation from the container due to the interengagement of the segments 38 with the lip 42.

Further means on the lid for engaging the end of a container 44 are also seen in FIGS. 4, 6 and 7 in the form of sealing ribs 46 and the inside surface 26a of skirt 26. These structures cooperate to form a continuous circumferential seal between the lid 10 and the lip 42 of container 44.

As seen in FIG. 4 skirt 26 varies in thickness around the lid, the skirt being thickest at regions denoted by reference character 50 located at spokes 26 (seen in cross section in FIG. 7) and thinnest at regions 51 located midway between the spokes, and illustrated in cross section in FIG. 6. Varying the thickness of the skirt minimizes the use of plastic resin without compromising the structural integrity of the skirt. Thicker skirt regions 50 are located relatively to secondary panels 14 so as to underlie seams between adjacent secondary panels formed by abutting edges 60a and 60b, best seen in FIG. 1 and described in detail below. The thinnest sections of the skirt underlie the center of secondary panels 14. Thus, the skirt 26 and the secondary panels 14 complement each other to provide strength and rigidity to the lid. Where the skirt is weaker, as at 51, the secondary panel is continuous, and where the secondary panels are weaker due to the presence of a seam, the skirt is relatively thicker, as at 50.

Ribs 46 extend radially inwardly from the inside surface 26a of the skirt 26 and are preferably arranged adjacent to one another in a plurality of rows extending longitudinally along the skirt, parallel to the axis 24. The rows of ribs are arranged circumferentially around the skirt at spaced intervals over the thinner skirt regions 51. Each rib 46 has a distal edge 48 which extends to approximately the same inner diameter as the skirt inside surface 26a in the thicker skirt region 50. Thus both the skirt inside surface 26a at regions 50 and the distal edge 48 of ribs 46 form a continuous means for frictionally engaging lip 42 on container 44 to provide a continuous seal between the lid and container.

Making The Lid

Figure 8:
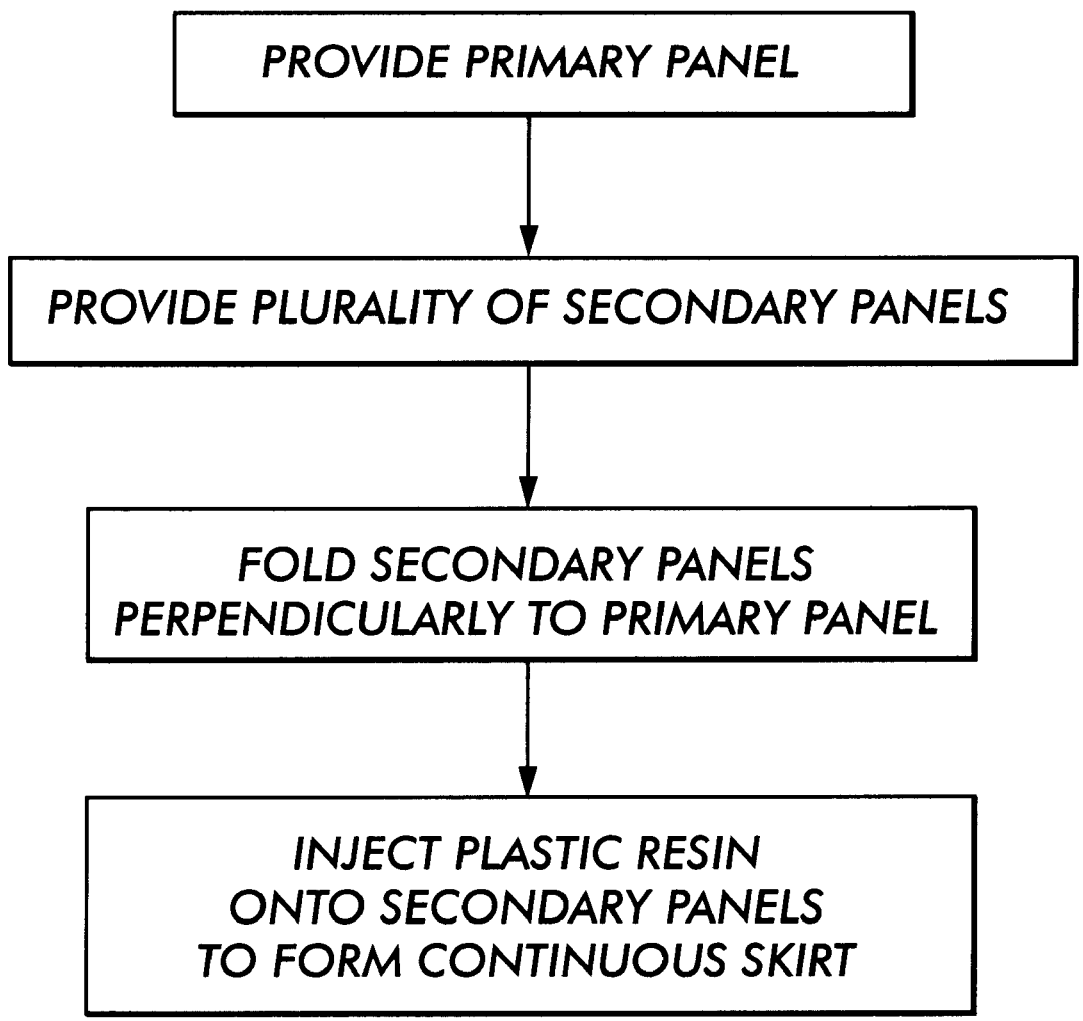
FIG. 8 is a flow chart showing steps in a preferred method of making a lid according to the invention as shown in FIG. 1.

FIG. 8 provides a flow chart describing the basic steps comprising a preferred method for making a lid according to the invention. As seen in the flow chart, primary and secondary panels are provided, the secondary panels are then folded perpendicularly to the primary panel, and plastic resin is injected onto the secondary panels to form the skirt.

Figure 2:
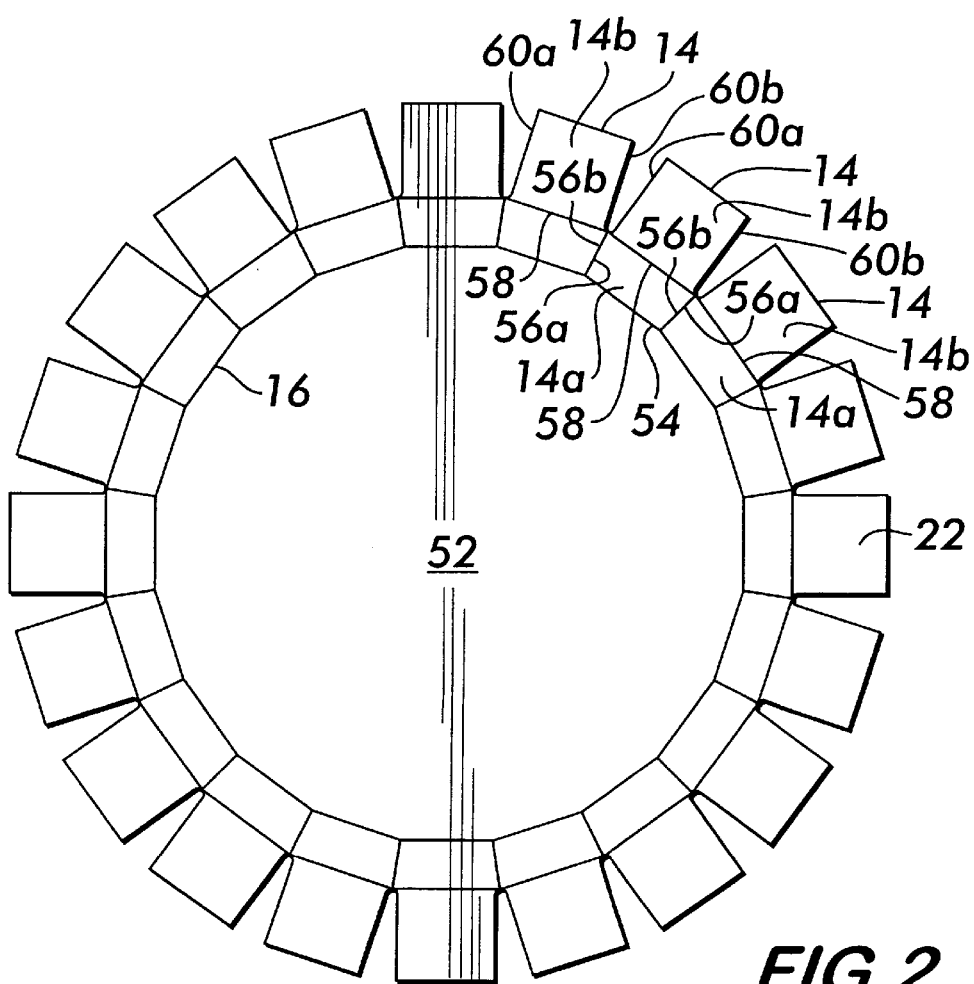
FIG. 2 is a plan view of a paperboard blank used in forming the composite lid shown in FIG. 1.

Preferably, the primary and secondary panels are provided in the form of a unitary blank 52 as seen in FIG. 2. Secondary panels 14 are formed from a first sub-panel 14a joined to the primary panel 12 along a first fold line 54 arranged along the perimeter 16 of the primary panel. Each first sub-panel 14a is slit to perimeter 16 forming oppositely arranged side edges 56a and 56b, respectively, which are in abutting relationship with adjacent side edges 56b and 56a of neighboring first sub-panels. The abutting relationship of the edges 56a and 56b may vary depending upon the shape to be formed by the lid, but for the preferred embodiment as shown, the mutually abutting relationship is advantageous as it provides for a continuous outer covering for receiving print media.

As further seen in FIG. 2, each secondary panel 14 also has a second sub-panel 14b distally joined to a first sub-panel 14a along a second fold line 58. Second sub-panels 14b are disposed adjacent to neighboring second sub-panels, and each has oppositely arranged side edges 60a and 60b. Side edges 60a and 60b are angularly displaced from adjacent side edges 60b and 60a, respectively, on neighboring second sub-panels so that when the second sub-panels are folded along second fold lines 58 the edges 60a and 60b of neighboring second sub-panels 14b will be brought into abutting interengagement as seen in FIG. 1 to completely cover skirt 26. Together, the primary panel 12 and the first and second sub-panels 14a and 14b form a substantially continuous outside surface 62 of the lid 10 for receiving imprinted indicia.

After the secondary panels 14 are folded, the plastic resin is injected onto them to form the skirt 26. As seen in FIG. 6 and noted above, the secondary panels are folded to one side 20 of the primary panel 12 presenting inside faces 22 for accepting the injected resin. The preferred method for adhering the skirt 26 to the secondary panels 14 is to coat the blank 52 with a thin layer 61 of the same or a compatible material as is used to form the skirt. Upon injection, the molten resin will fuse with the material coating the blank, thus, attaching the skirt 26 to the secondary panels 14. The same technique is used to attach bar 30 to primary panel 12 and allows the lid to be formed economically in an injection molding process without the need for special jigs, tooling and adhesive which other methods require.

Both the folding and injection steps take place in a mold 64, shown in partial section in FIG. 5. The mold has a cavity portion 66 and an interfitting core portion 68 which, when interfitted, define a void within which blank 52 is placed between the mold portions which fold the blank substantially to its final shape when interfitted. The resin is then injected into the mold forming the skirt and other resin portions of the lid. It is preferable to inject the resin from one or more points adjacent to the outside surface 62 of the lid because this simplifies the design of the mold. The outside surface 62 is usually defined by the cavity portion 66 of the mold 64 and is typically free of cooling ducts and other components and therefore presents a cleaner, less complicated path for the injection of the resin, than, for example, a path directed through the core portion 68.

However, this means that the resin must be injected through the folded blank 52 so as to adhere to the inside surfaces 22 of the secondary panels 14, as well as the other side 20 of the primary panel 12. As seen in FIG. 5, resin is injected through the folded blank 52 by aligning adjacent side edges 56a and 56b of a pair of neighboring first sub-panels 14a with a gate 70 in the mold through which resin 72 is injected by an injector means 74. The resin, under pressure, easily passes between the adjacent side edges of the neighboring sub-panels forming a port 76 and fills the void in mold 64, adhering to the inside surfaces 22 of the secondary panels 14 and the side 20 of the primary panel 12. FIG. 1 shows ports 76 in between secondary panels 14 where the resin was injected from the outside surface 62 to the inside surfaces 22 of the secondary panels 14. Multiple injection points are preferable to ensure equal distribution of resin around the mold to produce a lid of high quality and sufficient thickness of resin.

As a further aid to distribution of the resin, each gate 70 is aligned with a selected pocket 78 (see FIG. 5). Generally the pockets 78 comprise part of the mold void and form the spokes 36 when the resin is injected. As seen in FIG. 7, the spokes 36 are connected to the bar 30, which implies that the pocket 78 is connected to a part of the mold void 79 shaped like a channel (see FIG. 5) which is disposed circumferentially around the lid 10 to form the bar 30. By injecting the resin at a pocket 78, the resin flows into the channel, which has a relatively substantial cross-section and, therefore, presents little resistance to the flow of the resin around the entire circumference of the mold. The presence of the channel 79 forming the bar 30, thus promotes the even distribution of resin to all parts of the mold, including other pockets 78 communicating with channel 79 where resin is not otherwise injected through a gate. This mold configuration ensures that resin is reliably distributed to form a high quality lid.

Whereas the channel promotes distribution of resin around the lid, the pockets 78 promote resin distribution specifically to the skirt 22. Resin flows readily from the channel 79 to the other connected pockets 78 as described above and then to the inside surfaces 22 of the secondary panels 14 to form the skirt 22, the skirt being defined by another part of the mold void 81. As seen in FIG. 6 and explained above, the skirt 22 tends to be thinner in between the spokes 36 as opposed to a section taken at a spoke, depicted in FIG. 7. This feature minimizes the use of resin, which can have significant economic impact when the savings per lid is multiplied by the millions of lids produced.

The invention, thus combines dissimilar materials in the form of plastic resin and plastic coated paperboard to each material's inherent advantage to provide a composite lid which is economical to produce, robust, impervious to harsh environments, and has a continuous outer surface over the entire lid capable of receiving a print media for the display of high-quality graphics depicting the trademarks or trade dress of a manufacturer, making the product held in the container closed by the lid immediately recognizable amid the confused jumble of a retail display.

What is claimed is:

1. A lid for a container, said lid comprising:
    a primary panel forming the center of said lid, said primary panel having an outer perimeter;
    a plurality of secondary panels each joined continuously to said primary panel at said perimeter, said secondary panels being oriented substantially perpendicularly to the plane of said primary panel and extending to one side thereof, said secondary panels each having an inside surface facing toward the center of said lid, said primary and secondary panels being formed from a material receptive of a print media;
    a skirt oriented substantially perpendicularly to the plane of said primary panel, said skirt having a face attached to each said inside surface of said secondary panels, said skirt being formed from a relatively rigid material and supporting said secondary panels.

2. A lid according to claim 1, wherein said skirt is formed from a plastic resin.

3. A lid according to claim 2, wherein said plastic resin is polyethylene.

4. A method according to claim 3, wherein said primary and secondary panels are formed from paper coated with plastic resin.

5. A method according to claim 4, wherein said skirt is fused to said surfaces of said secondary panels.

6. A lid according to claim 2, wherein said plastic resin is polystyrene.

7. A lid according to claim 2, wherein said plastic resin is polypropylene.

8. A lid according to claim 1, wherein said primary and secondary panels are formed from paperboard coated with a plastic resin.

9. A lid according to claim 1, further comprising a bar having relatively substantial cross-sectional area attached to said one side of said primary panel and extending around said perimeter, said bar being attached to an end of said skirt proximal to said primary panel.

10. A lid according to claim 9, further comprising a plurality of spokes extending between said bar and said skirt, thereby attaching said bar to said skirt.

11. A lid according to claim 10, wherein said bar and said spokes are integrally molded with said skirt.

12. A lid according to claim 10, wherein said lid is round and said spokes are arranged circumferentially about said lid, said spokes extending radially between said skirt and said bar.

13. A lid according to claim 1, wherein at least two of said secondary panels have adjacent side edges arranged in mutually abutting relationship to substantially continuously cover a portion of said face of said skirt and thereby provide a portion of the outside surface of said lid for imprinting indicia thereon.

14. A lid according to claim 13, further comprising a port formed between said adjacent side edges, said port permitting the injection of a plastic resin material between said secondary panels from said outside surface of said lid to said inside surface of said secondary panels to form said skirt.

15. A lid according to claim 1, wherein said secondary panels have adjacent side edges arranged in mutually abutting relationship with one another to substantially continuously cover said face of said skirt, said primary and secondary panels thereby forming a substantially continuous outside surface of said lid for the imprinting of indicia thereon.

16. A lid according to claim 1, further comprising a plurality of elongated sealing ribs extending from a surface of said skirt opposite said face, said sealing ribs being arranged along said skirt parallel to said primary panel in a spaced apart relationship adjacent to one another, said sealing ribs being engagable with a container lip to provide a sealed interface between said lid and said container.

17. A lid according to claim 1, further comprising a plurality of elongated raised segments extending from a surface of said skirt opposite said face, said segments being spaced end to end intermittently around said skirt and oriented parallel to said primary panel for engaging a lip of a container and retaining said lid thereto.

18. A lid according to claim 1, wherein said primary and secondary panels are formed from a unitary blank, each of said secondary panels comprising:
   a first sub-panel being joined directly to said primary panel along a first fold line, each of said first sub-panels being disposed adjacent to a neighboring first sub-panel and having two oppositely arranged side edges, each being in abutting relationship with a side edge of one of said neighboring first sub-panels;
   a second sub-panel distally joined to said first sub-panel along a second fold line, each of said second sub-panels being disposed adjacent to a neighboring second sub-panel and having two oppositely arranged side edges each being angularly displaced from a side edge of one of said neighboring second sub-panels;
   said first sub-panels being folded along said first fold lines in overlying relationship with and covering an end of said skirt proximal to said primary panel, said second sub-panels being folded along said second fold lines into overlying relationship with and covering said skirt, said second sub-panel side edges being brought into abutting interengagement upon said folding and forming a continuous surface on said skirt, an injection moldable plastic forming said skirt being fused to said secondary panels and holding said secondary panels substantially perpendicularly to said plane of said primary panel, said skirt further forming a sealing surface interengagable with a container.

19. A lid according to claim 18, wherein said end of said skirt extends out of the plane of said primary panel in a direction opposite to said one side.

20. A lid according to claim 18, wherein said lid has a round shape.

21. A lid for a container, said lid comprising:
   a skirt defining a closed perimeter and having an inner face engagable with one end of the container and an outer face arranged opposite to said inner face, said skirt being formed from a relatively stiff material;
   a covering adhered to the outer face of said skirt and having a central portion extending continuously therefrom and overlying an area bounded by said perimeter, said covering being formed from a relatively thin material having an outwardly facing surface receptive of print media.

22. A lid according to claim 21, wherein said covering continuously covers the entire outer face of said skirt and the entire area bounded by said perimeter.

23. A lid according to claim 21, wherein said skirt is formed of thermoplastic material.

24. A lid according to claim 23, wherein said covering comprises paper coated with a thermoplastic material, said covering being adhered to said skirt by fusing of said thermoplastic material of said skirt and said covering.

25. A lid according to claim 21, further comprising means for engaging said container arranged on said inner face of said skirt.

26. A lid according to claim 25, wherein said container engaging means comprises an elongated segment arranged circumferentially around said skirt, said segment extending radially inwardly from said inner face and having a distal end interengagable with a lip formed on the end of said container, said segment for removably retaining said lid to said container.

27. A lid according to claim 26, further comprising a plurality of said segments arranged end to end at spaced intervals circumferentially around said skirt, said segments being oriented parallel to an edge of said skirt.

28. A lid according to claim 25, wherein said container engaging means comprises a rib extending inwardly from said inner face of said skirt, said rib being arranged circumferentially around said skirt and having a distal end for frictionally engaging a lip formed on the end of said container thereby providing a seal between said lid and said container.

29. A lid according to claim 28, having a plurality of said ribs arranged circumferentially at spaced intervals around said skirt.

30. A lid according to claim 29, wherein said ribs are arranged adjacent to one another in a plurality of rows extending longitudinally along said skirt.

31. A lid according to claim 21, further comprising:
   a reinforcing bar having a relatively substantial cross-sectional area, said bar being arranged concentrically with said skirt and attached to said central portion of said covering opposite to said outwardly facing surface;
   a plurality of spokes extending between said reinforcing bar and said skirt thereby attaching said reinforcing bar to said skirt, said spokes being arranged at spaced intervals along said reinforcing bar.

32. A lid according to claim 31, wherein said skirt has a greater thickness at a section taken through said skirt at one of said spokes than the thickness at a section taken through said skirt in between said spokes.

33. A lid according to claim 31, wherein said skirt and said reinforcing bar are round and said spokes extend radially therebetween.

34. A method of making a lid for a container, said method comprising the steps of:
   providing a primary panel for forming the center of said lid, said primary panel having an outer perimeter;
   providing a plurality of secondary panels each being joined continuously to said perimeter, said primary and secondary panels being formed from a material receptive of a print media;
   folding said secondary panels substantially perpendicularly to the plane of said primary panel, each of said secondary panels being folded to one side of said primary panel and having a surface facing the center of said primary panel;
   injecting a liquid plastic resin onto said surfaces of said secondary panels to form a continuous skirt, said skirt being attached to each said surface of said secondary panels and supporting said secondary panels in a folded configuration thereby forming a lid having a continuous outer surface capable of receiving said print media formed by said primary and secondary panels.

35. A method according to claim 34, wherein said folding step comprises folding a plurality of said secondary panels into edge-abutting relationship with an adjacent secondary panel.

36. A method according to claim 34, wherein said folding step comprises folding each of said secondary panels into edge-abutting relationship with an adjacent secondary panel, said skirt being attached to each said surface of said secondary panels while in said edge abutting relationship, said secondary and said primary panels thereby continuously covering substantially the entire outer surface of said lid.

37. A method according to claim 34, wherein said injecting step comprises injecting said plastic resin at a point adjacent to said perimeter from another side of said primary panel opposite to said one side.

38. A method according to claim 37, wherein said folding step comprises folding at least two of said secondary panels into edge-abutting relationship with one another, and said injecting step comprises injecting said plastic resin between said two adjacent secondary panels to form said skirt.

39. A method according to claim 37, wherein said injecting step comprises injecting said plastic resin at plurality of locations around said perimeter.

40. A method according to claim 34, wherein said injecting step further comprises forming a bar from said plastic resin, said bar having a relatively substantial cross-sectional area, and said attaching step comprises attaching said bar to said perimeter.

41. A method according to claim 40, wherein said injecting step further comprises forming a plurality of spokes from said plastic resin, said spokes extending between said bar and said skirt.

* * * * *